(12) United States Patent
Brown et al.

(10) Patent No.: US 9,710,460 B2
(45) Date of Patent: Jul. 18, 2017

(54) OPEN MICROPHONE PERPETUAL CONVERSATION ANALYSIS

(71) Applicant: International Business Machines Corporation, Armonk, NY (US)

(72) Inventors: Michael S. Brown, Wahroonga (AU); Stefan Harrer, Hampton (AU); Laurence J. Plant, North Balwyn (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/735,285

(22) Filed: Jun. 10, 2015

(65) Prior Publication Data
US 2016/0364381 A1    Dec. 15, 2016

(51) Int. Cl.
*G06F 17/27* (2006.01)
*G10L 15/32* (2013.01)

(52) U.S. Cl.
CPC ............ *G06F 17/279* (2013.01); *G10L 15/32* (2013.01)

(58) Field of Classification Search
CPC ................................. G10L 15/32; G06F 17/279
See application file for complete search history.

(56) References Cited

U.S. PATENT DOCUMENTS

| 8,571,529 | B2 * | 10/2013 | Lauper | G06F 17/30743 340/539.11 |
|---|---|---|---|---|
| 2009/0002157 | A1 * | 1/2009 | Donovan | H04N 7/18 340/540 |
| 2011/0002451 | A1 * | 1/2011 | Moran | H04M 3/42221 379/88.22 |
| 2011/0033036 | A1 | 2/2011 | Edwards et al. | |
| 2011/0044447 | A1 * | 2/2011 | Morris | G06T 11/206 379/265.03 |
| 2011/0082690 | A1 * | 4/2011 | Togami | H04R 1/406 704/201 |
| 2013/0024196 | A1 * | 1/2013 | Ganong, III | G10L 17/00 704/246 |
| 2014/0009562 | A1 * | 1/2014 | Hegde | H04N 7/157 348/14.07 |

(Continued)

OTHER PUBLICATIONS

J. G. Fiscus, "A post-processing system to yield reduced word error rates: Recognizer Output Voting Error Reduction (ROVER)," Automatic Speech Recognition and Understanding, 1997. Proceedings., 1997 IEEE Workshop on, Santa Barbara, CA, 1997, pp. 347-354.*

*Primary Examiner* — Douglas Godbold
(74) *Attorney, Agent, or Firm* — Aaron N. Pontikos; David B. Woycechowsky

(57) ABSTRACT

A conversation analytics system including multiple microphones that each respectively capture at least a part of a single real world natural language conversation. The natural language data (for example, audio of natural language, or audio of natural language converted to text) from each of the multiple microphones is combined into a single combined piece of natural language data (for example, a combined audio file, or a combined piece of text). This combined piece of natural language data is subject to: (i) machine logic based natural language understanding; and/or (ii) community conversation analysis. The multiple microphones may be respectively built into mobile devices which are always on and which are generally always carried by the device owners on their respective persons.

14 Claims, 3 Drawing Sheets

(56) References Cited

U.S. PATENT DOCUMENTS

| | | | |
|---|---|---|---|
| 2014/0177813 A1 | 6/2014 | Leeds et al. | |
| 2014/0200891 A1* | 7/2014 | Larcheveque | G06F 17/2785 704/243 |
| 2014/0219464 A1* | 8/2014 | Goldstein | H04R 1/1091 381/58 |
| 2014/0270114 A1* | 9/2014 | Kolbegger | G10L 25/93 379/88.08 |
| 2015/0006177 A1* | 1/2015 | DeLand | H04L 12/1813 704/251 |
| 2015/0106091 A1* | 4/2015 | Wetjen | G10L 15/26 704/235 |
| 2015/0179186 A1* | 6/2015 | Swierk | G06F 3/167 704/276 |
| 2015/0302868 A1* | 10/2015 | Sikveland | G10L 25/78 704/239 |
| 2015/0339327 A1* | 11/2015 | Unitt | G06F 17/30289 707/803 |
| 2015/0348570 A1* | 12/2015 | Feast | H04M 3/5175 704/270 |
| 2016/0012818 A1* | 1/2016 | Faizakof | G06F 17/30705 704/245 |

\* cited by examiner

OPEN MICROPHONE PERPETUAL CONVERSATION ANALYSIS

BACKGROUND OF THE INVENTION

The present invention relates generally to the field of analysis of audio recording (especially audio recording by mobile devices), and more also to audio analysis performed by software to detect natural language speech.

U.S. Pat. No. 8,571,529 ("529 Lauper") discloses as follows: "[A] method for continuously recording surrounding information through a mobile device is disclosed. The recording part of the mobile device of the user is continuously switched on and records all surrounding information such as noise, conversations, telephone conversations, conferences etc. of the user through an integrated microphone. It is possible in another embodiment that such a device is fixedly installed in a conference room." (reference numerals omitted).

US patent application 2009/0002157 (157 Donovan) discloses as follows: "An audio surveillance, storage, and alerting system, including the following components: One or more audio sensory devices capture audio data . . . . One or more audio analytics devices process the audio data to detect audio events . . . . [A]n alerting engine generates one or more alerts and performs one or more actions based on the correlation performed by [a] correlation engine."

SUMMARY

According to an aspect of the present invention, there is a method, computer program product and/or system that performs the following operations (not necessarily in the following order): (i) receiving first natural language data based on audio data sensed by a first microphone and second natural language data based on audio data sensed by a second microphone, where the first and second microphones are within conversational proximity to each other when the first and second microphones respectively sense the first and second natural language data; (ii) determining, by machine logic, that the first natural language data and the second natural language data each include at least a portion of a first real world natural language conversation; (iii) combining at least the first and second natural language data into third natural language data corresponding to the natural language of the first real world natural language conversation; and (iv) performing, by machine logic, natural language understanding on the third natural language data to yield at least a first insight information.

According to a further aspect of the present invention, a method includes the following operations (not necessarily in the following order): (i) receiving first natural language data based on audio data sensed by a first microphone, deployed in a first community, and second natural language data, deployed in a the first community, based on audio data sensed by a second microphone, where the first and second microphones are within conversational proximity to each other when the first and second microphones respectively sense the first and second natural language data; (ii) determining, by machine logic, that the first natural language data and the second natural language data each include at least a portion of a first real world natural language conversation; (iii) combining at least the first and second natural language data into third natural language data corresponding to the natural language of the first real world natural language conversation; (iv) receiving historical conversation data corresponding to other conversations in the first community; and (v) performing, by machine logic on the third natural language data and the historical conversation data, common conversation analysis by community conversation analytics to yield at least a first insight information relating to subject matter that is being discussed across the first community.

DETAILED DESCRIPTION

Figure 1:
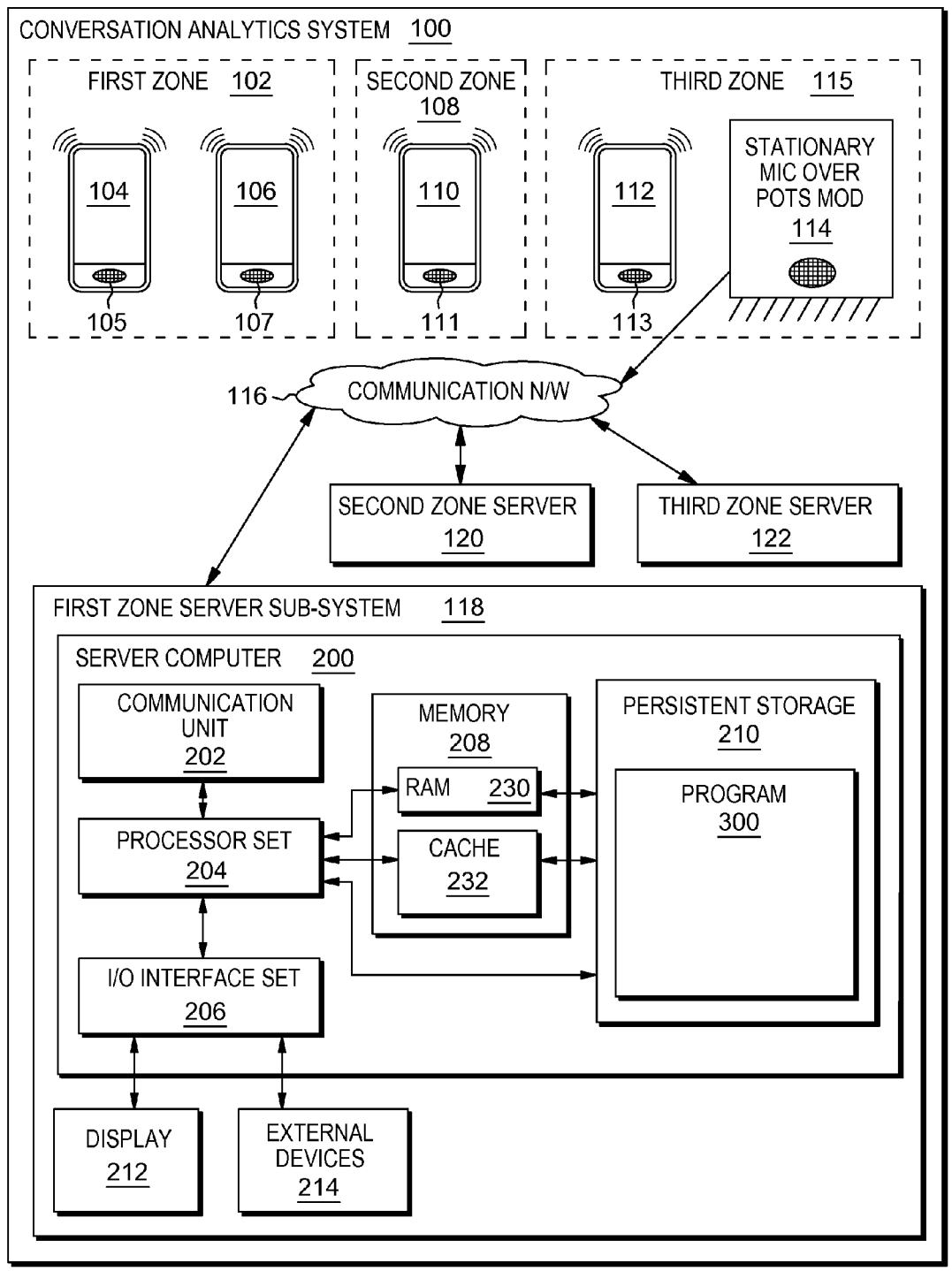
FIG. 1 is a block diagram view of a first embodiment of a system according to the present invention.

Some embodiments of the present invention include multiple microphones that each respectively capture at least a part of a single real world natural language conversation. The natural language data (for example, audio of natural language, or audio of natural language converted to text) from each of the multiple microphones is combined into a single combined piece of natural language data (for example, a combined audio file, or a combined piece of text). This combined piece of natural language data is subject to: (i) machine logic based natural language understanding; and/or (ii) community conversation analysis.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 shows conversation analytics system 100 including: first zone 102; second zone 108; third zone 115; first mobile device 104 (including built-in microphone 105); second mobile device 106 (including built-in microphone 107); third mobile device 110 (including built-in microphone 111); fourth mobile device 112 (including built-in microphone 113); stationary mic over plain old telephone system (POTS) module 114; communication network 116; first zone server sub-system 118; second zone server sub-system 120; third zone server sub-system 122; server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 118 is, in many respects, representative of the various computer sub-system(s) in the present invention. Accordingly, several portions of sub-system 118 will now be discussed in the following paragraphs.

Sub-system 118 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 118 is capable of communicating with other computer sub-systems via network 116. Network 116 can be, for example, a local area network (LAN), a wide area network (WAN) such as the Internet, or a combination of the two, and can include wired, wireless, or fiber optic connections. In general, network 116 can be any combination of connections and protocols that will support communications between server and client sub-systems.

Sub-system 118 is shown as a block diagram with many double arrows. These double arrows (no separate reference numerals) represent a communications fabric, which provides communications between various components of sub-system 118. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 118; and/or (ii) devices external to sub-system 118 may be able to provide memory for sub-system 118.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 118. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
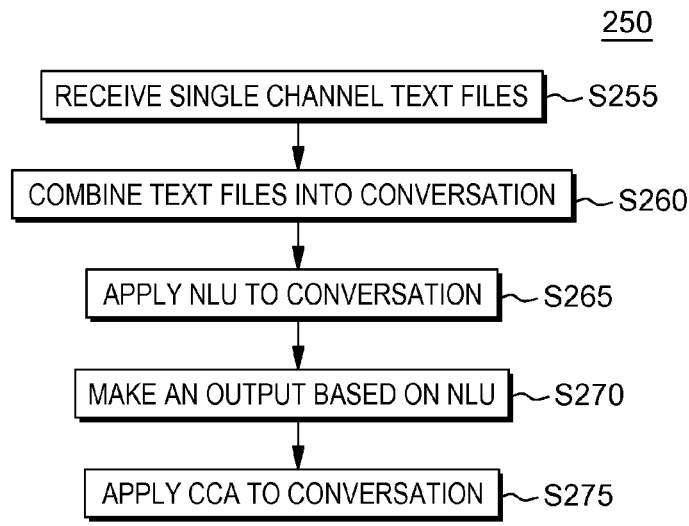
FIG. 2 is a flowchart showing a first embodiment method performed, at least in part, by the first embodiment system.
Figure 3:
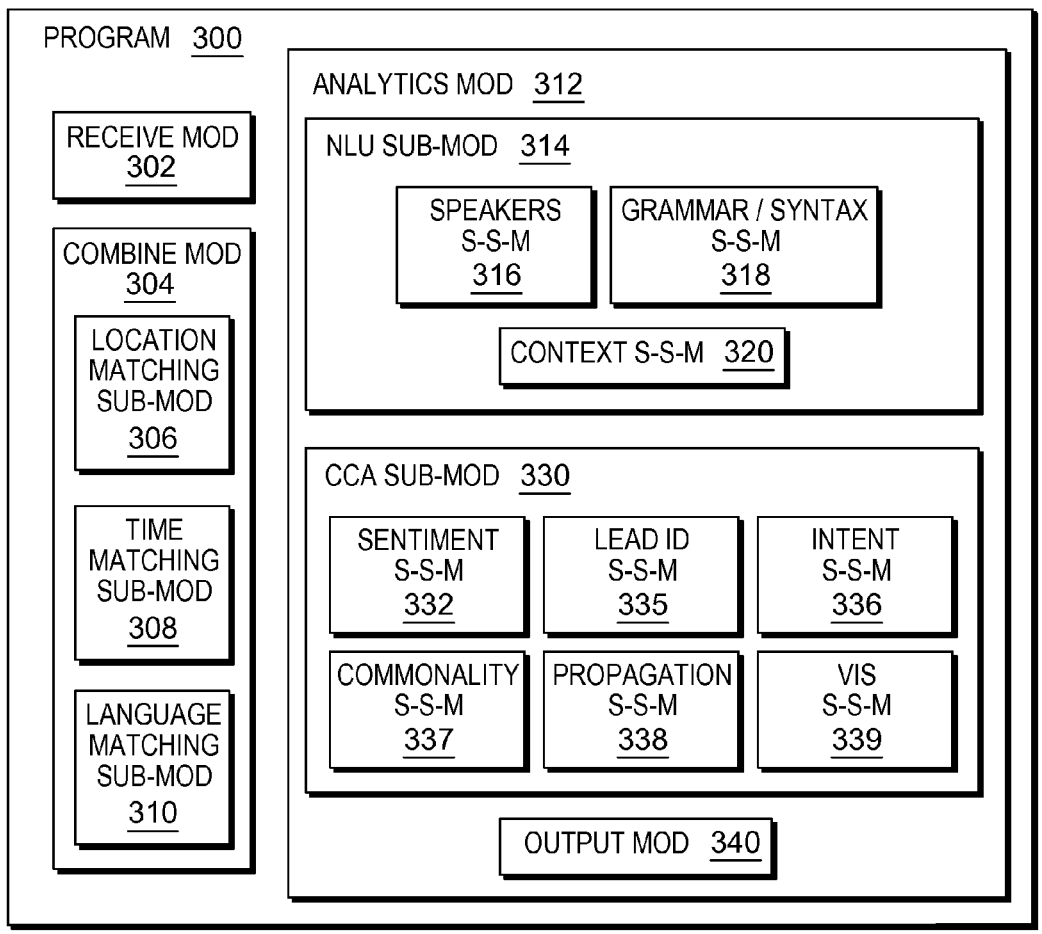
FIG. 3 is a block diagram showing a machine logic (for example, software) portion of the first embodiment system.

FIG. 2 shows flowchart 250 depicting a method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Before discussing the operations of flowchart 250, some preliminary remarks will be made concerning the operation of the hardware of system 100 shown in FIG. 1. First of all, this simple example system includes only five microphones 105, 107, 111, 113 and 114. Alternatively, some systems according to the present invention may include hundreds, thousands, or even millions of microphones. In this example, all of the microphones are always on, and always capturing any audio within microphone range. If a natural language conversation is, at least partially, in the range of a microphone, then that microphone is in "conversational proximity" to the natural language conversation. As will be further discussed, below, in some embodiments, multiple microphones in conversational proximity to a common real world natural language conversation may have their sensed natural language data combined (as audio or as text converted from audio) so that combined natural language data, corresponding to the common conversation, can be subjected to natural language understanding processing and/or community conversation analytics.

In this simple example embodiment, the various microphones may move between three geographic zones (except for stationary microphone over POTS mod 114, which is stationary and tied to a telephone style land line). During operation, each mobile device 104, 106, 110, 112: (i) converts into text any natural language audio data that its microphone picks up; (ii) attempts to associate different pieces of natural language text with different speakers; and (iii) sends "natural language data" to the server 118, 120, 122 designated to its current zone. In this embodiment, the natural language data from the mobile devices includes: (a) the text converted from the audio data; (b) the speaker data mapping different portions of the text to different speakers (and, when voice recognition, providing identity and/or biographical information about the various speakers); and (c) geographic position data (for example global positioning system (GPS) data corresponding to the location of the microphone at the time the natural language text is sensed by the microphone of the mobile device.

In this embodiment, the natural language data from stationary mic over POTS module 114 merely includes an analog audio data signal, that has not been digitally processed, which is sent as analog audio data to third zone server 122. Third zone server 122 is: (i) equipped to process the analog audio data received from module 114; and (ii) knows the location of the mic of module 114 because module 114 is stationary. The differences between the natural language data communicated by the mobile devices and the natural language data communicated by module 114 help to show the variety of forms and/or formats that "natural language data" may take in various embodiments of the present disclosure.

In the example of flowchart 250, immediately prior to step S255, mobile device 104 receives audio of a real world natural language conversation through mic 105, converts the audio to text with its built in speech-to-text-capability module (not separately shown) to generate a single channel text file (which is time and date stamped by a clock and global positioning module (not separately shown)), and sends the following time and date stamped single channel text to server sub-system 118:
Timestamp: 12:00:00; Location Co-ordinates: First Zone, 5000 by 7000
Device 104 User: You know, that pipe is leaking in Room 28 again.
Other Speaker: Going to check on it . . . afternoon
Device 104 User: You need to replace that section.
Other Speaker: Copper?
Timestamp: 12:00:30; Location Co-ordinates: First Zone, 5002 by 6999
Device 104 User: Peeveecee. [sigh] It is in the Handbook.
Other Speaker: Where are they kept?
Device 104 User: [sigh] It is in the Handbook.
Other Speaker: I'll . . . two days.
Device 104 User: Sounds good.

Also, immediately prior to step S255, mobile device 106 receives audio of a real world natural language conversation through mic 107, converts the audio to text with its built in speech-to-text-capability module (not separately shown) to generate a single channel text file (which is time and date stamped by a clock and global positioning module (not separately shown)), and sends the following time and date stamped single channel text to server sub-system 118:
Timestamp: 12:00:00; Location Co-ordinates: First Zone, 5002 by 7001
Other Speaker: You know, that pie is leaky in Room 28 egg in.
Device 106 User: Going to check on it at 2:30 this afternoon.
Other Speaker: You need to . . . .
Device 106 User: Copper?
Timestamp: 12:00:30; Location Co-ordinates: First Zone, 5000 by 7001
Other Speaker: Peevishly . . . hand book.
Device 106 User: Where are they kept?
Other Speaker: It is in the Handbook.
Device 106 User: I'll get on that today.
Other Speaker: Sounds good.

Before moving ahead to the discussion of operation S255, a couple of observations about the two single channel text files will be made. It is noted that the two single channel text files transcribed above do not match. Each transcript contains some words that the other transcript does not have because microphones 105 and 107 are in different locations and orientations relative to the two speakers (that is, device 104 and device 106 user). Also, some of the words do not match because some words which were picked up, were not picked up sufficiently well to be correctly interpreted by the text-to-speech capabilities of the respective devices. Also, it can be seen from the above transcript that the text to speech capability of each device 104, 106 recognizes the voice of its respective user, but not the voice of the other user. Finally, it is noted that the text-to-speech capabilities in this example not only include words, but also: (i) inflections indicating questions (see the question marks in the above transcripts); and (ii) communicative sounds other than words (see the sighs in the above transcripts).

Processing begins at operation S255, where mobile device 104 and mobile device 106 respectively send their single channel text files through communication network 116 to be received at receive module ("mod") 302 of program 300 of first zone server sub-system 118 (see FIG. 1).

Processing proceeds to operation S260, where combine mod 304 combines the two single channel text files to create a conversation text file (not separately shown in the Figures). The process of combination includes matching the single channel natural language sources with respect to: (i) location (see location matching sub-mod 306); (ii) time (see time matching sub-mod 308); and (iii) words and/or other sounds, such as non-word utterances and/or ambient sounds (see language matching sub-mod 310). In this example, after the combination process performed by combine mod 304, the conversation text file reads as follows:
Timestamp: 12:00:00; Location Co-ordinates: First Zone, 5000 by 7000
Device 104 User: You know, that pipe is leaking in Room 28 again.
Device 106 User: Going to check on it at 2:30 this afternoon.
Device 104 User: You need to replace that section.
Device 106 User: Copper?
Timestamp: 12:00:30; Location Co-ordinates: First Zone, 5000 by 7000
Device 104 User: Peeveecee. [sigh] It is in the Handbook.
Device 106 User: Where are they kept?
Device 104 User: [sigh] It is in the Handbook.
Other Speaker: I'll get on that today.
Device 104 User: Sounds good.

In this example, combine mod 304 includes machine logic to reconcile the two transcripts where they differ (for example, one transcript includes words the other doesn't, or the detected words are different as between the two transcripts). In this way, the combination of natural language data from multiple different microphones yields natural language conversation data that has a better accuracy and quality than the natural data from the microphones taken individually. Also, in this example, the conversation text file, created by mod 304, correctly identifies the speaker for each piece of spoken natural language, whereas the single channel text files, considered individually, could not do this. This example combines natural language data in the form of natural language text. Alternatively, other embodiments may combine natural language data that has been converted to other forms, such as combining audio data to form a combined piece of natural language audio data.

Processing proceeds to operation S265, where natural language understanding (NLU) sub-mod 314 of analytics mod 312 applies natural language understanding machine logic to the conversation text file to generate NLU output information (not separately shown). In this example, the following NLU output information is generated: (i) device 106 user needs to check a leak in Room 28 at 2:30 pm; and (ii) device 106 user needs to replace a section with plastic pipe today. In determining this NLU output information: (i) speakers sub-sub-mod 316 of NLU mod 314 determines that it is device 106 user (rather than device 104 user or a third party) that needs to check the leak and replace a section; (ii) grammar/syntax sub-sub-mod 318 determines that the "section" which needs to be replaced is a section of pipe because pipe was referred to earlier in the real world natural language conversation and is the appropriate referent for the somewhat vague word "section"; and (iii) context sub-sub-mod 320 determines that "peeveecee" (or "P.V.C.") refers to a plastic pipe by consulting the online Handbook that these speakers use in their jobs and determining that "P.V.C." is a common way of referring to plastic pipe sections.

Processing proceeds to operation S270, where output mod 340 sends the NLU output information to mobile devices 104, 106 through communication network 116 (see FIG. 1) for the benefit of the users (not separately shown) of those mobile devices. In this example, output mod outputs the following text messages to device 106: (i) at 2:25 pm: "Check a leak in Room 28 at 2:30 pm"; and (ii) at 4:30 pm (a half hour before close of business): "Make sure you replace a section of pipe with plastic pipe today."

Processing proceeds to operation S275, where community conversation analysis (CCA) sub-mod 330 of analytics mod 312 applies CCA machine logic to generate CCA output information (not separately shown). This CCA output information is sent out to other computers and/or devices as appropriate by output mod 340. The CCA output information determined by sub-mod 330 and sent out by mod 340, in this example, will be discussed in more detail in the following paragraphs.

Sentiment sub-sub-mod 332 of CCA sub-mod 330 determines the following sentiment-type CCA output information: "Device 104 user is frustrated that device 106 user is not more familiar with the Employee Handbook." This frustration is detected by the repeated references to the "Handbook," and also the sighs uttered in lexical proximity to the "Handbook." In response to the determination of this sentiment-type CCA output information, output mod 340 sends the following text message to device 104 user in the form of an email: "You may want to check that device 104 user has access to a copy of the Employee Handbook."

Lead identification (ID) sub-sub-mod 335 of CCA sub-mod 330 determines the following leadership-type CCA output information: "Device 104 user has shown leadership qualities." This leadership role of device 106 user is detected by the fact that device 104 user is explaining the work that needs to be done to device 106 user in the conversation text file produced by combine mod 304. In response to the determination of this leadership-type CCA output information, output mod 340 sends data to an employee rewards system (not shown) to indicate that device 104 user has earned points toward an employee reward (a kind of bonus system set up by the employer) based on good job performance.

Intent sub-sub-mod 336 of CCA sub-mod 330 determines the following intent-type CCA output information: "Device 106 user intends to purchase a section of plastic pipe for replacing a leaking section of pipe in Room 28." This intention is detected because of the following information: (i) device 106 user agrees to replace the section with plastic pipe; and (ii) context information that the employer's facilities have no plastic pipe in inventory at the current time. In response to the determination of this intent-type CCA output information, output mod 340 sends instant messages (IMs) to computer systems of local plastic pipe sellers (not separately shown): "Device 104 user may be seeking to purchase plastic pipe today, so you may want to let him know about any special offers on plastic pipe that you may have."

Commonality sub-sub-mod 337 of CCA sub-mod 330 determines the following commonality type CCA output information (also sometimes referred to herein as "common conversation analysis): "Employees seem to commonly opt for plastic pipe over copper pipe because one common conversation pattern is that a choice is made between copper and plastic pipe and the result of the conversation is that plastic pipe is shown." In response to the determination of this commonality-type CCA output information, output mod 340 sends the following text message to the company's investment fund managers in the form of an email: "You may want to avoid investing company funds in copper companies and start investing in companies that make plastic, especially poly-vinyl chloride type plastic."

As with the other forms of community conversation analytics, common conversation analysis typically uses as input data the new conversation, along with historical data reflecting many pre-existing conversations that have taken place in the community. These historical conversations may take many and various forms, such as email conversations, conversations transcribed into digital data from written conversations, conversations detected by a single microphone as audio data, conversations detected by multiple microphones, telephone conversations, instant messaging (IM) type chats, and so on. When the new conversation of this example has common subject matter with previous historical conversations, this will increase the level of "commonality" that the subject matter has in the community from which the new conversations and the historical conversations have taken place.

Propagation sub-sub-mod 338 of CCA sub-mod 330 determines the following propagation-type CCA output information: "Information tends to flow from the Employee Handbook to device 104 user and then to device 106 user."

Visualization ("vis") sub-sub-mod 339 of CCA sub-mod 330 determines visualization-type CCA output information. Visualization is the ability to graphically represent conversations to a user of the system, for example, show what conversation subjects or ideas are trending, how views differ across different demographics.

III. Further Comments and/or Embodiments

In some embodiments of the present invention a distinguishing feature is the use of an "open mic (microphone)," that is, a microphone in the presence of the user which is always on and capturing the audio of the user's physical environment. The open mic perpetually provides audio input to the system which can be deployed on a consumer electronic device or on a server in the network.

In some embodiments of the present invention, the system and method enable the following functions: (i) recording, storage, indexing and retrieval of audio using known techniques; (ii) analysis of audio using known techniques to produce text transcription of conversations on a best-effort basis; (iii) analysis of text to establish suggestions for the user; (for example, the system could prompt the user to "add milk to the shopping list?" or "schedule to meet Sally and Sam at 9 pm Friday?)"; (iv) analysis of audio and text to attribute speech to candidate speakers (that is, the system identifies who may have said what, and learns to recognize some speakers over time); (v) analysis of audio and/or text to translate between different languages; (vi) analysis of audio data to detect keywords/unusual conversation patterns (for example for monitoring cockpit conversations on airplanes); (vii) analysis and detection of compromised audio data to correct, for example, the speech impaired); (viii) user interface for searching, retrieving and accessing past conversations and the transcribed text, where search is based on different conditions including time, place, subject, speakers, phrase (for example, the user can ask "what did I have to buy?" or "when am I meeting Sally and Sam?"); (ix) proactive reminders triggered by different factors such as time and location (for example, when at the supermarket "don't forget to buy milk"); (x) linking and retrieval of conversations around a particular subject (for example, "show me conversations about the house purchase"); (xi) splicing, which uses sharing of captured audio and analyzed text between multiple users; and/or (xii) uses a visual cue to indicate the recording system is on.

Further, with respect to item (xi) in the above paragraph, splicing enables analysis of a conversation to be based on what is captured by different devices. This enables further functions including: (i) identifying who else was present; and/or (ii) allows recording higher quality audio by splicing the best audio segments into one (that is, the best quality audio is typically always captured by the microphone nearest the speaker, and the final record of conversation is established by using the audio captured by search microphone nearest each speaker.)

Some embodiments of the present invention may include one, or more, of the following features, characteristics and/or advantages: (i) records conversations; (ii) analyzes conversations; (iii) uses an "always-on" open microphone for an individual; (iv) available on consumer electronic devices; (v) oriented to help an individual recall conversations; (vi) enables splicing of input from different microphones; (vii) exhibits indexing capability that link people into long-running conversational threads; and/or (viii) exhibits indexing capability that link subjects into long-running conversational threads.

Figure 4:
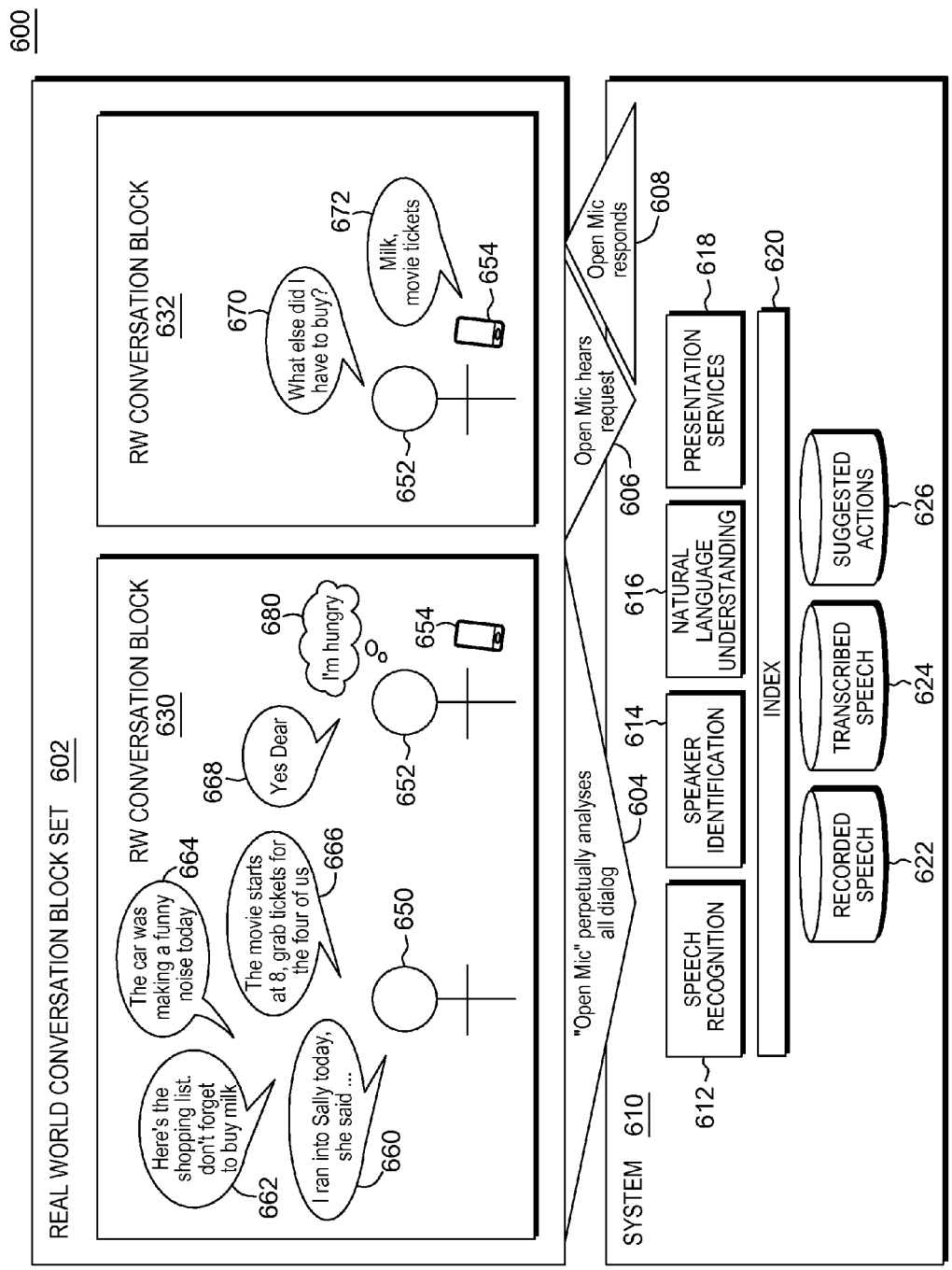
FIG. 4 is a block diagram of a second embodiment of a system according to the present invention.

As shown in FIG. 4 environment 600 includes: real world conversation block set 602; communication paths 604, 606, 608; and system 610. Real world conversation block set 602 includes: real world conversation block 630; and real world conversation block 632. Real world conversation block 630 includes: person 650; person 652; consumer electronic device 654; speech bubbles 660, 662, 664, 666, 668, and thought bubble 680. Real world conversation block 632 includes: person 652, consumer electronic device 654; and speech bubbles 670, 672. System 610 includes: speech recognition mod 612; speaker identification mod 614; natural language understanding mod 616; presentation services mod 618; index mod 620; recorded speech data store 622; transcribed speech data store 624; and suggested actions data store 626.

As shown in real world conversation block 630, person 650 and person 652 are two human beings having a conversation in a natural language called the English language. An open mic (not separately shown), which is built into consumer electronic device 654, perpetually sends all dialog to system 610 to be analyzed as shown by communication path 604. System 610 performs its machine-logic-based analysis to determine what items person 652 needs to buy based upon the conversation of block 630. In this way, person 652 does not need to manually update a shopping list (for example, a handwritten shopping list) based on his conversation with person 650. Later on, in real world conversation block 632, person 652 asks consumer electronic device 654 for her shopping list (see speech bubble 670 and communication path 606), device 654 and system 610 responds (see speech bubble 672 and communication path 608) with the items suggested by the earlier conversation of block 630. It is noted that some, or all, of the functionality blocks shown as system 610, separate from device 654, could alternatively be located in device 654, especially as the processing power, memory resources and/or storage resources of mobile devices increase over time.

In some embodiments of the present invention the key subsystems are: (i) one or more speech subsystems for continuous speaker independent speech recognition, which listens to audio and on a best-effort basis converts it to text; (ii) a system which identifies on a best effort basis who it thinks is speaking; (iii) natural language understanding which is a set of frameworks for putting the text into a meaningful context; (iv) a database which records all audio input and is a repository of all recorded speech; (v) a database which houses the record of transcribed speech in text format (this includes the system's level of confidence in the accuracy of the speech); (vi) a database which houses the system's set of recommended or suggested actions; (vii) presentation services which provides the user interface, enabling the user to ask questions (for example, "what time did Sally say the movie starts?"); and/or (viii) presentation services which provides the user interface, enabling the user to review the text and audio of conversation to confirm what was said by who.

Further with regard to item (vi) in the above paragraph, recommended actions are the system's understanding of what should be done by the user based on what it has understood of the conversations. An example of a suggested action is "buy movie tickets for 4 people for 8 pm".

Some embodiments of the present invention may include one, or more, of the following features, characteristics and/or advantages: (i) application(s) to a microphone, which is perpetually open; (ii) provides a user interface and indexing capability that links people into long-running conversational threads; and/or (iii) provides a user interface and indexing capability that links subjects into long-running conversational threads.

Some embodiments of the present invention may include one, or more, of the following features, characteristics and/or advantages: (i) performs cognitive analysis on the recording stream before deciding to store information; (ii) learns based on user behaviour; (iii) is efficient in performance; (iv) is efficient in storage; (v) the system immediately analyses the audio as it is received by the microphone before the audio being stored in a file; (vi) is a "data in motion" cognitive analytical method which supports analysis on the device at the point of capture or in the network on a server; (vii) listens without recording; and/or (viii) can stream to a server without recording.

Further with regard to item (vi) in the above paragraph, the advantages of the "data in motion" analytical model are: (i) low latency (analysis is done immediately); (ii) reduced network capacity (data analysed on the device is not relayed to the server); (iii) reduced storage capacity (audio is not stored so there is significantly less data storage requirements); and/or (iv) ability to add significantly more listening devices and microphones at lower infrastructure cost.

Some embodiments of the present invention may include one, or more, of the following features, characteristics and/or advantages: (i) supports real-time analysis; (ii) supports real-time understanding of audio captured; and/or (iii) supports a plurality of mobile devices.

In some embodiments of the present invention, the capability of the present invention is to provide analysis, understanding, and synthesis across a plurality of devices and users, supplying additional capabilities such as: (i) the ability to record, analyze and understand a complete conversation across a set of users and microphones in the same place at the same time; (ii) enables analysis to be based on the best quality audio regardless of which microphone captures the audio; and/or (iii) the ability to record, analyze and understand a set of conversations across a set of users in different places at different times.

Further with regard to item (iii) in the above paragraph, the ability to record, analyze and understand a set of conversations across a set of users in different places at different times creates: (i) an understanding of the multiparty conversation including sentiment of the community towards a particular subject; (ii) the origin, dispersion and evolution of ideas across the community; (iii) the origin, dispersion and evolution of ideas across the social network(s); and/or (iv) levels of trust between people.

Further with regard to item (i) two paragraphs above, the inability to record, analyze and understand a complete conversation across a set of users and microphones in the same place at the same time may be due to: (i) some microphones in the environment may be too far away to clearly capture all of the audio; (ii) the audio captured by one microphone may not be able to be analyzed because of noise; (iii) having two or multiple people speaking in the background at the same time; and/or (iv) some people being farther away from one microphone but nearer another.

Some embodiments of the present invention may include one, or more, of the following features, characteristics and/or advantages: (i) is not limited to identifying what was said but does interpret the meaning or significance of what was said; (ii) incorporates natural language understanding and cognitive computing to understand what was said; (iii) incorporates natural language understanding and cognitive computing to take appropriate action (for example, recognizes the request to buy milk and reminds the user when they are at the supermarket to buy milk); and/or (iv) does not require a sleep mode to function effectively.

In some embodiments of the present invention, privacy is defined as the ability for the user to identify context in which listening is not to occur. Privacy can be based on time, place, company, subject being discussed (or other factors). Privacy policy is set by the user or others and is triggered by different events such as: (i) GPS (global positioning system) location; (ii) GPS presence; (iii) an environmental privacy trigger such as an RFID (radio frequency Identification) tag; and/or (iii) a short distance wireless signal fixed to the environment.

Some embodiments of the present invention may include one, or more, of the following features, characteristics and/or advantages: (i) focuses a plurality of different devices with microphones associated with a user (or present in the physical environment) and not associated with specific users; (ii) does not store audio; (iii) provides analytics on the device or in the network on the server; (iv) applies natural language understanding and cognitive computing across a plurality of devices to establish the context and an understanding of the discussions in the community; and/or (v) applies natural language understanding and cognitive computing across a plurality of audio input sources to establish the context and an understanding of the discussions in the community.

Some embodiments of the present invention may include one, or more, of the following features, characteristics and/or advantages: (i) a microphone which is perpetually open (listening); (ii) listening is not limited to a subset of communications over a network; (iii) analyzes audio as "data in motion"; (iv) does not analyze recorded audio ("data at rest"); (v) uses multiple microphones across the community, being a plurality of devices; (vi) audio analysis premised on natural language understanding and cognitive computing to establish the meaning of what was said; and/or (vii) audio analysis premised on natural language understanding and cognitive computing to act upon the meaning of what was said.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method comprising:
 determining, based on a context of a conversation, that a privacy policy is not triggered, wherein:
  the privacy is triggered based on receiving a signal; and
  the privacy policy prevents receiving audio data;
 receiving first natural language data based on audio data sensed by a first microphone and second natural language data based on audio data sensed by a second microphone, where the first microphone and the second microphone are within conversational proximity to each other when the first microphone and the second microphone respectively sense the first natural language data and the second natural language data, wherein the first microphone senses natural language of at least a first user and a second user, and wherein the second microphone senses natural language of at least the first user and the second user;

determining, by machine logic, that each of the first natural language data and the second natural language data correspond to a first real world natural language conversation between the first user and the second user;

determining, by machine logic, that the first natural language data and the second natural language data corresponding to the first real world natural language conversation include at least a first conversational portion that does not match;

reconciling, by machine logic, at least the first conversational portion to yield at least a first matching conversational portion;

combining the first natural language data and the second natural language data into a third natural language data corresponding to the natural language of the first real world natural language conversation, wherein the third natural language data includes at least the first matching conversational portion; and performing, by machine logic, natural language understanding on the third natural language data to yield at least a first insight information.

2. The method of claim 1 further comprising:
outputting the first insight information in human understandable form and format.

3. The method of claim 1 further comprising:
performing conversation analytics on the third natural language data to determine at least one of the following: sentiment, intent, social leader identification, propagation tracking, common conversation identification, and/or visualization.

4. The method of claim 3 wherein:
the performance of conversation analytics includes propagation tracking; and subject matter of the propagation tracking includes an idea.

5. The method of claim 1 wherein the first natural language data and the second natural language data are received as text-based data derived from audio sensed by the first microphone and the second microphone.

6. The method of claim 1 wherein:
the first microphone is built into a first mobile device which is always on; and
the second microphone is built into a second mobile device which is always on.

7. A computer program product comprising a computer readable storage medium having stored thereon:
first program instructions programmed to determine, based on a context of a conversation, that a privacy policy is not triggered, wherein:
the privacy is triggered based on receiving a signal; and
the privacy policy prevents receiving audio data;
second program instructions programmed to receive first natural language data based on audio data sensed by a first microphone and second natural language data based on audio data sensed by a second microphone, where the first microphone and the second microphone are within conversational proximity to each other when the first microphone and the second microphone respectively sense the first natural language data and the second natural language data, wherein the first microphone senses natural language of at least a first user and a second user, and wherein the second microphone senses natural language of at least the first user and the second user;

third program instructions programmed to determine, by machine logic, that each of the first natural language data and the second natural language data correspond to a first real world natural language conversation between the first user and the second user;

fourth program instructions programmed to determine, by machine logic, that the first natural language data and the second natural language data corresponding to the first real world natural language conversation include at least a first conversational portion that does not match;

fifth program instructions programmed to reconcile, by machine logic, at least the first conversational portion to yield at least a first matching conversational portion;

sixth program instructions programmed to combine the first natural language data and the second natural language data into a third natural language data corresponding to the natural language of the first real world natural language conversation, wherein the third natural language data includes at least the first matching conversational portion; and seventh program instructions programmed to perform, by machine logic, natural language understanding on the third natural language data to yield at least a first insight information.

8. The product of claim 7 wherein the medium has further stored thereon:
eighth program instructions programmed to output the first insight information in human understandable form and format.

9. The product of claim 7 wherein the medium has further stored thereon:
ninth program instructions programmed to perform conversation analytics on the third natural language data to determine at least one of the following: sentiment, intent, social leader identification, propagation tracking, common conversation identification, and/or visualization.

10. The product of claim 9 wherein:
the ninth program instructions are further programmed to perform conversation analytics including propagation tracking; and
subject matter of the propagation tracking includes an idea.

11. The product of claim 7 wherein the first program instructions are further programmed to receive the first natural language data and the second natural language data as text-based data derived from audio sensed by the first microphone and the second microphone.

12. The product of claim 7 wherein:
the first microphone is built into a first mobile device which is always on; and the second microphone is built into a second mobile device which is always on.

13. The product of claim 7 further comprising a computer system including:
a processor(s) set; and
a computer readable storage medium; wherein:
the processor set is structured, located, connected and/or programmed to run program instructions stored on the computer readable storage medium.

14. A method comprising:
determining, based on a context of a conversation, that a privacy policy is not triggered, wherein:
  the privacy is triggered based on receiving a signal; and
  the privacy policy prevents receiving audio data;
receiving first natural language data based on audio data sensed by a first microphone, deployed in a first community, and second natural language data based on audio data sensed by a second microphone, deployed in the first community, where the first microphone and the second microphone are within conversational proximity to each other when the first microphone and the second microphone respectively sense the first natural language data and the second natural language data, wherein the first microphone senses natural language of at least a first user and a second user, and wherein the second microphone senses natural language of at least the first user and the second user;
determining, by machine logic, that each of the first natural language data and the second natural language data correspond to a first real world natural language conversation between the first user and the second user;
determining, by machine logic, that the first natural language data and the second natural language data corresponding to the first real world natural language conversation include at least a first conversational portion that does not match;
reconciling, by machine logic, at least the first conversational portion to yield at least a first matching conversational portion;
combining the first natural language data and the second natural language data into a third natural language data corresponding to the natural language of the first real world natural language conversation, wherein the third natural language data includes at least the first matching conversational portion;
receiving historical conversation data corresponding to other conversations in the first community; and
performing, by machine logic on the third natural language data and the historical conversation data, common conversation analysis by community conversation analytics to yield at least a first insight information relating to the subject matter that is being discussed across the first community.

\* \* \* \* \*